United States Patent [19]

Ezaki et al.

[11] Patent Number: 4,564,877
[45] Date of Patent: Jan. 14, 1986

[54] MAGNETIC RECORDING/REPRODUCING SYSTEM WITH WIDE-GAPPED TRANSDUCER AND METHOD FOR USING SAME

[75] Inventors: Joichiro Ezaki; Hiroshi Kanai; Yoshimi Kitahara, all of Nagano, Japan

[73] Assignee: TDK Corporation, Tokyo, Japan

[21] Appl. No.: 486,682

[22] Filed: Apr. 20, 1983

[30] Foreign Application Priority Data

Apr. 28, 1982 [JP] Japan ................................. 57-72211
Apr. 28, 1982 [JP] Japan ................................. 57-72212
Apr. 28, 1982 [JP] Japan ................................. 57-72213

[51] Int. Cl.$^4$ ............................. G11B 5/22; G11B 5/30
[52] U.S. Cl. .................................... 360/114; 360/119; 360/122
[58] Field of Search ................................. 360/111–113, 360/114, 115, 119, 122–126; 369/110, 46; 365/122

[56] References Cited

U.S. PATENT DOCUMENTS 3,984,874 10/1976 Mano ................................... 360/119
4,228,473 10/1980 Himuro et al. ........................ 360/114
4,423,450 12/1983 Hamilton ............................. 360/123

FOREIGN PATENT DOCUMENTS 1306848 2/1973 United Kingdom ................ 360/111

Primary Examiner—Stuart N. Hecker
Assistant Examiner—David J. Severin
Attorney, Agent, or Firm—Collard, Roe & Galgano

[57] ABSTRACT

A magnetic recording method for recording a digital signal in the form of a two dimensional plane on a magnetic recording medium like a magnetic tape, a magnetic disc etc. Magnetic flux is generated according to a shape of the surface of the magnetic recording head facing the recording medium. Thus, digital information is recorded on the recording medium in the form of two dimensional information according to the shape of the surface of the magnetic head.

A magnetic recording medium on which two dimensional information has been recorded by the above recording method, and a reproducing method for reproducing the recorded information on said magnetic recording medium are also disclosed.

8 Claims, 7 Drawing Figures

MAGNETIC RECORDING/REPRODUCING SYSTEM WITH WIDE-GAPPED TRANSDUCER AND METHOD FOR USING SAME

BACKGROUND OF THE INVENTION

The present invention relates to a magnetic recording and reproducing system. More particularly, the present invention relates to a magnetic recording system for recording a digital signal in the form of a two dimensional plane on a magnetic recording medium such as a magnetic tape, a magnetic disc and so on. The present invention also relates to a magnetic recording medium on which a digital signal has been recorded by the above recording system, and to a reproducing system for the recorded information on the magnetic recording medium.

Conventionally, magnetically recorded information, recorded for instance on a magnetic tape, a magnetic disc, or a magnetic sheet, is read out by a magnetic head which has a magnetic core with a thin gap and a coil wound on said core. A magnetic head operates on the principle that the relative movement of the head to the recording medium generates electromotive force on the coil according to the recorded information.

However, that conventional magnetic head has the disadvantage that the recording density on a recording medium can not be so high. It is said that a conventional magnetic head needs a recording track wider than 30 μm.

In order to solve the above problem, one of the solutions is an optical head which reads out magnetically recorded information using an optic-magnetic effect or the Faraday effect. According to that optical head, a soft magnetic film which has a magnetically soft nature contacts with a recording medium which records information magnetically, and the vertical component of the magnetically recorded information on the recording medium is copied on that soft magnetic film. The information on the soft magnetic film is read out optically using the Faraday effect in which an optical beam is subject to the rotation of the polarization plane according to the magnetic direction of a magnetic domain of that soft magnetic film. As the Faraday effect is used, an optical polarizer and an optical analyzer are usually used to detect the optical rotation of a polarized optical beam.

Japanese Patent Laid-Open No. 100713/79 discloses a system for recording a figure or a letter as it is on a magnetic recording medium, and for reproducing it therefrom with an optical technique. This prior system records the data on the recording medium such that a small magnetic pole is moved in accordance with the shape of the data pattern to be recorded. However, this prior system has the disadvantage that its structure becomes very complicated because of the necessity of the relative movement of the small magnetic pole or the recording medium to the data pattern to be recorded.

SUMMARY OF THE INVENTION

It is an object of the present invention to overcome the above-mentioned problems of the prior art by providing a new and improved magnetic recording and reproducing system for recording a digital signal in the form of a two dimensional plane on a magnetic recording medium easily.

It is another object of the present invention to provide a magnetic recording and reproducing system by which a recorded signal is reproduced with a high signal to noise (S/N) ratio.

It is a further object of the present invention to provide a magnetic recording medium on which digital information has been recorded in the form of a two dimensional plane by said magnetic recording and reproducing system.

It is a still further object of the present invention to provide an optical reproducing method whereby the magnetically recorded two dimension data on the magnetic recorded medium can be reproduced with an improved S/N ratio.

The above and other objects are attained by a magnetic recording method and system for recording a two dimension pattern on a magnetic recording medium comprising: generating magnetic flux according to a shape of a surface of a magnetic head facing to said magnetic recording medium, and recording magnetically said two dimentional pattern on a region of said magnetic recording medium according to the shape of said surface of said magnetic head.

Also, said objects are attained by a magnetic recording medium in which a two dimensional pattern is recorded as an elementary information on two regions adjacent each other, one of said two regions being magnetized oppositely to the another one, and a reproducing method for reproducing a recorded two dimension pattern which has been recorded as an elementary information on two regions ajacent each other of a magnetic recording medium in which said two dimension pattern is obtained by taking out a differential output of the stored data in said two regions.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

Figure 1:
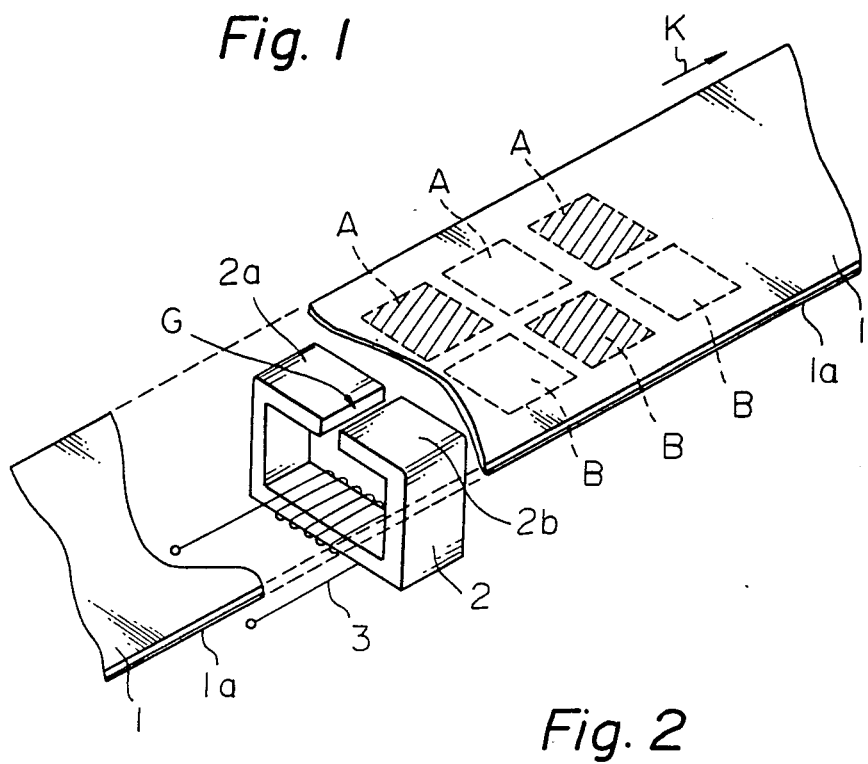
FIG. 1 is the explanatory drawing of the theoretical principle of the present recording system.
Figure 2:
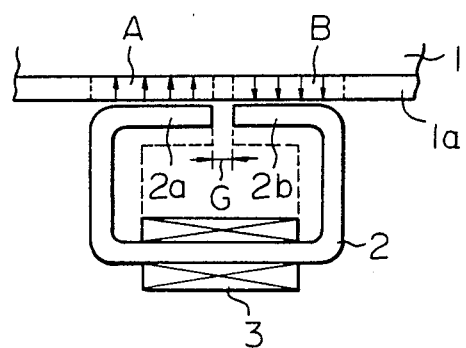
FIG. 2 is also the explanatory drawing of the present recording system.

First, one example of a magnetic recording for the optical reading is described in accordance with FIGS. 1 and 2 for the easy understanding of the present invention.

In FIG. 1, the reference numeral 1 is a magnetic recording medium with a magnetic recording film 1a. That recording medium 1 is, for instance, a magnetic tape or a magnetic disc, and the magnetic medium 1 runs in the direction K. The magnetic recording film 1a may be formed, for example, by depositing any suitable alloy like Co—Cr alloy. The magnetic recording head 2 with the gap G and the winding 3 is arranged close to said magnetic recording film 1a. The winding 3 is energized with a recording signal which is preferably in a digital form. It should be noted in FIG. 1 that the longitudinal direction of the gap G coincides with the running direction K of the magnetic medium while in a conventional magnetic recording system, a gap of a magnetic head is positioned perpendicular to the running direction of the magnetic medium. Further, it should be appreciated that the width of the gap G is considerably wide (for instance, 4 μm) as compared with a conventional magnetic head in which a gap width is for instance 0.3–0.5 μm. A signal to be recorded in this case is supposed to be in digital form, and the pulse width (μ sec) of the digital signal is considerably narrow as compared with the wavelength of the recorded signal on the recording medium 1. That wavelength is defined by the moving speed of the medium 1, and the repetition frequency of the signal. In one embodiment, when a tape runs with the speed of 4.7 cm/sec, the pulse width is less than 47 μsec, and is preferably less than 1.0 μsec, still preferably it is nsec order.

In the above configuration, when a recording signal flows in the coil 3, the magnetic flux circulates through the core, the yoke 2a, the area (A) of the medium 1, the area (B), and the yoke 2b. Thus, a pair of magnetic cells A and B, which may be N and S, or S and N are provided on the medium 1 according to the recording signal. Thus, those cells A and B store one bit of information. Those cells A and B may be N and S, or S and N according to the recording information (1 or 0). It should be noted that the shape of the pattern A and B is the same as the shape of the yokes 2a and 2b. Plurality pairs of cells compose a pattern of recorded data.

It should be appreciated that the magnetic flux generated by the winding 3 does not go through the gap G, but the flux goes through the first yoke, the medium and the second yoke, because that gap G is too wide to shunt the magnetic path.

This embodiment has the advantage that a digital recording/reproducing system for two dimensional pattern can be easily and simply constructed because the two dimensional data is stored in the paired cells A and B, the respective shape of the cells becomes substantially the same as that of the yoke of the magnetic head facing to the recording medium. Moreover, as the recording signal whose pulse width is considerably narrow compared with the wavelength of the recorded signal is used in this embodiment, data can be copied on the recording medium without any influence by the running speed of the recording medium. In this case, if the number of pulses of the recording signal supplied to the winding of the magnetic head is increased to improve the recording density, the duty ratio is restrained to be low. Thus, high density recording can be effected with a low level of consumed electric power.

Moreover, since an elementary information is recorded on the paired cells A and B in this embodiment, the recorded data can be reproduced with a high S/N ratio by obtaining the differential output from the paired cells.

Although the magnetic head is of a rectangular shape in the above embodiment, various shaped heads may be employed in accordance with the reception system of the reproducing apparatus. Moreover, a plurality of two-pole heads may be used for the present magnetic recording/reproducing system. Incidentally, the signal may be recorded not only by the vertical recording system but also the conventional horizontal recording system.

Figure 3:
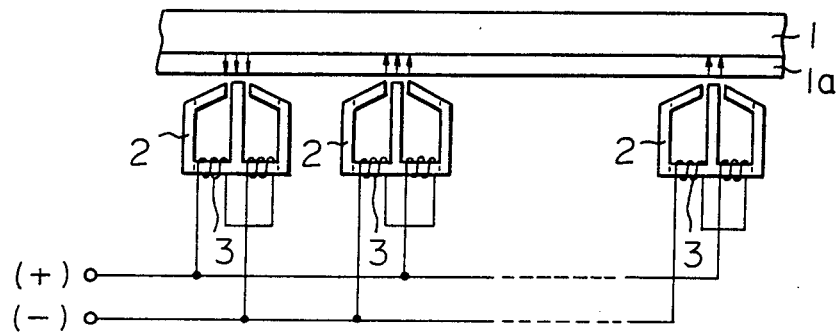
FIG. 3 shows another example of the present recording system.

FIG. 3 shows another example of the magnetic recording system according to the present invention. In this case, a plurality of monopole magnetic heads 2 are arranged at a predetermined interval in the direction perpendicular to the running direction of the medium 1. In this system, respective windings are connected so that current directions of the windings of the adjacent ones are opposite from each other. In the above configuration, recording is effected in a similar manner as described before. On the other hand, according to the present invention, magnetic recording may be effected with a single monopole magnetic head by switching the direction of the signal current flowing in the winding thereof. In these examples, a two dimensional pattern can also be recorded on the medium in high quality so that the recorded data is reproduced with high S/N ratio upon reproducing.

Figure 4:
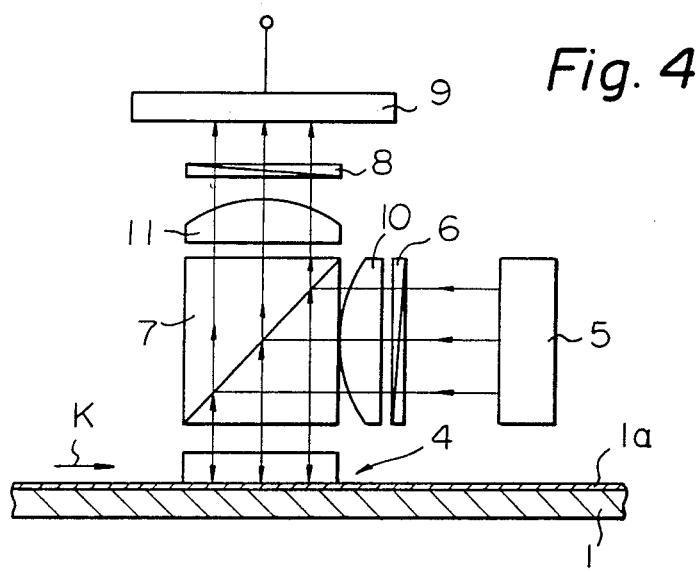
FIG. 4 shows the structure of the optical read-out system according to the present invention.

FIG. 4 shows the optical reproducing system according to the present invention, in which the same reference numerals show the same members as those in the previous figures. The reference numeral 4 is an optical head which operates on the principle of the optic-magnetic effect.

Figure 5:
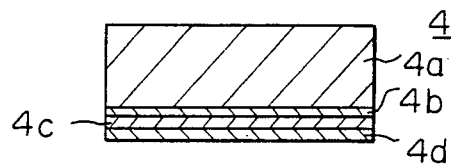
FIG. 5 shows the cross section of the read-out head according to the present invention.

FIG. 5 shows the cross section of that optical head 4 in detail. In FIG. 5, the symbol 4a is a GdGa garnet substrate which is optically transparent and has the thickness of 0.2–0.5 mm. The symbol 4b is a soft magnetic film with magnetically soft nature attached on the surface of that substrate 4a. The symbol 4c is a reflection film attached on the soft magnetic film 4b for reflecting a laser beam, and the symbol 4d is a protection layer of $S_iO_2$ attached on the reflection film 4c. The soft magnetic film 4b is made of the optically transparent and soft magnetic material, like $YS_mC_aF_eG_e$ group garnet (for instance $Y_{1.92}S_{m0.1}F_{e4.02}G_{e0.98}O_{12}$), and said soft magnetic film 4b has the easy magnetization axis which is perpendicular to the film plane, and said soft magnetic film has the thickness of about 6 μm. The optical head 4 is used so that the films 4b, 4c and 4d touch the recording medium 1.

When the optical head 4 touches with the recording medium 1, the magnetic domain in the soft magnetic film 4b is magnetized by the vertical component of the recorded data on the medium 1 in the vertical direction to the film plane. When a digital signal, like PCM signal is recorded on the medium, the magnetic pattern in the domain in the soft magnetic film is a copy of the digital signal recorded on the medium 1. That magnetic pattern of the domain is read out optically. Although the optical head 4 is employed in the above system, in one embodiment according to the present invention, the magnetic pattern of the domain of the magnetic recording medium may be directly read out optically without the optical head.

In FIG. 4, the reference numeral 5 is an optical source for generating an optical beam, and is implemented for instance by a light emitting diode (LED), 6 is a polarizer which polarizes linearly the beam from the optical source 5. The numeral 7 is a beam splitter which offsets the horizontal beam in the figure, but passes directly the vertical beam in the figure. The numerals 10 and 11 are a condenser lens and a focusing lens, respectively. The reference numeral 8 is an optical analyzer, and 9 is a CCD device.

In FIG. 4, an optical beam generated by the source 5 illuminates the optical head 4 through the polarizer 6 which polarizes the beam linearly, the beam splitter 7 which reflects or offsets the beam. It is supposed that the beam has some cross section area, and therefore, some area on the optical head 4 is illuminated simultaneously. The beam thus illuminating the optical head 4 is reflected by the reflection film 4c in the optical head 4, and the reflected beam illuminates the CCD device through the beam splitter 7, the lens 11, and the optical analyzer 8. When the beam illuminates the optical head, the polarization is rotated by the Faraday effect in the right or left direction according to the direction of the magnetization in the domain on the soft magnetic film 4b. Since the beam is polarized by the polarizer 6, the output beam from the analyzer 8 is modulated by the rotation direction by the Faraday effect, that is to say, the intensity of the beam at the output of the analyzer 8 depends upon the recorded data. The intensity of the modulated beam of the output of the analyzer 8 illuminates the CCD device 3 so that the two dimension pattern of the data on the medium is copied on the plane of the CCD device.

The optical beam used in the above system may be generated by a light emitting diode (LED), a laser and the like. Among them, it is more preferable to use the LED, because its cost is relatively low and the dimension of the beam from the LED is larger so that greater information can be read out compared with the laser beam.

When the two dimensional pattern has been recorded on the recording medium by the method explained in FIGS. 1 and 2, the pattern was stored in the paired cells A and B. That is to say, the direction of the magnetization of the cell A is opposite to that of the cell B. Accordingly, upon reproducing by the above-mentioned optical reproducing system, respective portions of the soft magnetic film 4b corresponding to the cells A and B are magnetized oppositely to each other. As a result, for instance the corresponding portion to the cell A is subjected to the rightward rotation of the polarization while the corresponding portion to the cell B is subjected to the leftward rotation of the polarization. Therefore, the corresponding portion of the soft magnetic film 4b to the cell B is optically considered as reversed to that of cell A. Thus, a differential output is obtained from the above two corresponding portions by means of the reception system 9 to reproduce desired data with a high S/N ratio.

Figure 6:
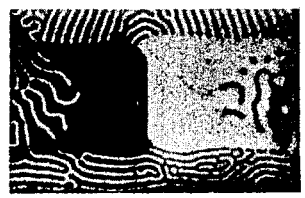
FIG. 6 is a microphotograph showing the states of the magnetizations on the soft magnetic film.

FIG. 6 is a microphotograph showing states of the magnetizations of the soft magnetic film 4b when using the recording method explained in FIGS. 1 and 2. It is clearly seen from this microphotograph that the maze domains of the soft magnetic film 4b are varied in accordance with the shape of the yoke of the magnetic head 2 facing the recording medium.

Figure 7:
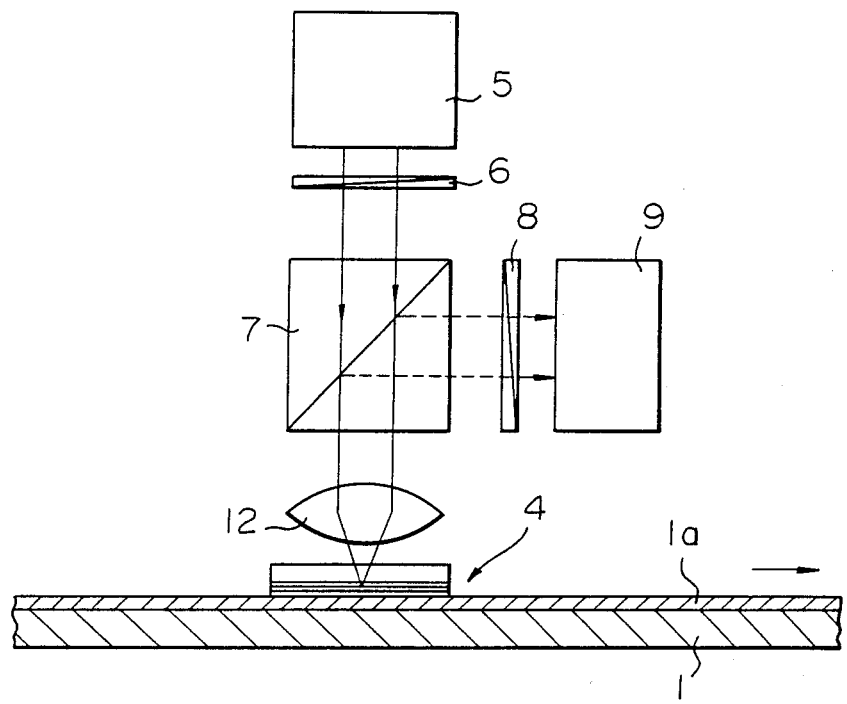
FIG. 7 shows the structure of another optical read-out system according to the present invention.

FIG. 7 shows another example of the optical recording system according to the present invention, in which the same reference numerals show the same member as those in FIG. 4. Although a plurality of recorded patterns recorded in certain regions of the recording medium 1 are read out simultaneously in the system in FIG. 4, the recorded patterns may be read out bit by bit by focussing the laser beam to be spot-like on the soft magnetic film 4b with an objecting lens 12, as shown in FIG. 7.

What is claimed is:

1. A method of recording digital information on a magnetic recording medium comprising the steps of:
    moving a magnetic head relative to the magnetic recording medium, the magnetic head being designed in the shape of a C-ring with a pair of confronting yokes, said yokes defining a gap therebetween having a longitudinal direction coinciding with the direction of said relative movement, said gap being wide enough so that magnetic flux generated in said C-ring by flowing current in a coil wound around the C-ring does not short-circuit said gap, but goes through the first yoke, a first region of the recording medium, a second region of said recording medium, and the second yoke of said head;
    generating magnetic flux according to the respective shapes of the surfaces of the yokes of the magnetic head facing the magnetic recording medium; and
    differentially magnetizing two regions of the magnetic recording medium to record a pair of two dimensional patterns thereon for each bit of information, the two regions being aligned transverse to the direction of said relative movement.

2. The method according to claim 1, wherein the pulse width of a signal applied to the magnetic head is small compared to the interval between successive signals with regard to the speed of relative movement between the head and the magnetic medium, and the size of the head in the direction of relative movement between the head and the magnetic medium, so that, in use, the two regions corresponding to one bit are separated from the two regions corresponding to the following bit in the direction of relative movement between the magnetic head and the magnetic recording medium.

3. A magnetic recording medium in which a two dimensional pattern is recorded as one bit information on two regions adjacent each other, by using the recording method according to claim 1, one of said two regions being magnetized oppositely to the other one.

4. A reproducing method for reproducing a recorded two dimensional pattern which has been recorded as one bit information on two regions adjacent each other of a magnetic recording medium, which has been recorded by moving a magnetic head relative to the magnetic recording medium, the magnetic head being designed in the shape of a C-ring with a pair of confronting yokes, said yokes defining a gap therebetween having a longitudinal direction coinciding with the direction of said relative movement, said gap being wide enough so that magnetic flux generated in said C-ring by flowing current in a coil wound around the C-ring does not short-circuit said gap, but goes through the first yoke, a first region of the recording medium, a second region of said recording medium, and the second yoke of said head, generating magnetic flux according to the respective shapes of the surfaces of the yokes of the magnetic head facing the magnetic recording medium, and differentially magnetizing two regions of the magnetic recording medium to record a pair of two dimensional patterns thereof for each bit of information, the two regions being aligned transverse to the direction of said relative movement; said reproducing method comprising the step of:
    taking out a differential output of the stored data in said two regions of said magnetic recording medium to obtain a two dimensional pattern.

5. The method according to claim 4, wherein the differential output of the vertical components of the magnetizations in said two regions of said magnetic recording medium are taken out.

6. The method according to claim 5, wherein the recorded two dimensional pattern is read out by using an optic-magnetic effect of a soft magnetic film.

7. A magnetic recording system for recording a pattern on a magnetic recording medium comprising:
   a magnetic recording head substantially in the shape of a C-ring with a pair of yokes at the ends thereof, a coil wound around said C-ring, and a gap between said yokes,
   means to cause relative movement between the magnetic recording head and a magnetic recording medium, said gap facing the recording medium and aligned with the relative direction of movement between the head and the recording medium,
   each of said yokes being parallel to the recording medium,
   said gap being wide enough so that magnetic flux generated in said C-ring by current flowing in said coil does not short-circuit said gap, but goes through the first yoke, a first region of the recording medium, a second region of said recording medium, and the second yoke of said head,
   whereby the pattern recorded on the recording medium extends in a first direction of relative movement between the head and the recording medium and in a second direction transverse to the direction of relative movement between the head and the recording medium and the shape of said pattern corresponds to the shape of said yokes which face the recording medium.

8. The system according to claim 7, wherein the shape of said yoke is rectangular.

* * * * *